United States Patent
Kolb et al.

[11] Patent Number: 6,028,606
[45] Date of Patent: Feb. 22, 2000

[54] CAMERA SIMULATION SYSTEM

[75] Inventors: Craig E. Kolb, Mountain View; Patrick M. Hanrahan, Portola Valley, both of Calif.; Donald P. Mitchell, Bellevue, Wash.

[73] Assignee: The Board of Trustees of the Leland Stanford Junior University, Stanford, Calif.

[21] Appl. No.: 08/904,978

[22] Filed: Aug. 1, 1997

Related U.S. Application Data

[60] Provisional application No. 60/023,055, Aug. 2, 1996.

[51] Int. Cl.$^7$ ....................................... G06T 17/00
[52] U.S. Cl. .......................... 345/419; 345/433; 382/255; 382/106; 356/3.02
[58] Field of Search ...................................... 345/421, 426, 345/427, 433, 419; 356/419, 3.02; 378/62, 4; 382/102, 255, 154, 106, 302; 348/36; 351/205, 211–214

[56] References Cited

U.S. PATENT DOCUMENTS

| | | | |
|---|---|---|---|
| 4,965,840 | 10/1990 | Subbarao | 382/106 |
| 5,193,124 | 3/1993 | Subbarao | 382/255 |
| 5,361,127 | 11/1994 | Daily | 356/3.02 |

OTHER PUBLICATIONS

Potmesil, M. et al., A lens and aperture camera model for synthetic image generation, Computer Graphics, vol. 15, No. 3, pp. 297–305, 1981.

Cook, R. et al., Distributed ray tracing, Computer Graphics, vol. 18, No. 3, pp. 137–145, 1984.

*Primary Examiner*—Mark R. Powell
*Assistant Examiner*—Chante Harrison
*Attorney, Agent, or Firm*—Lumen Intellectual Property Services

[57] ABSTRACT

A physical camera is modeled to render an image in a computer graphics system. When given the manufacturer's specifications of the physical camera's lenses, including the dimensions and indices of refraction of its lenses, stops, and shutter characteristics, the location of the film surface relative to the lens system, and the orientation of the camera within the scene, the invention accurately and efficiently mimics the physical principles of image formation creating an image which approximates an image produced by the physical camera. The procedure comprises four main elements: (1) the geometric relationships between the lens system, object, and film plane are modeled by precise placement and movement of lens elements, (2) image geometry is computed by using principles of geometric optics, (3) an exit pupil is calculated in order to define a region for efficiently sampling rays, (4) the image irradiance, or exposure at a pixel, is computed according to radiometric principles.

25 Claims, 9 Drawing Sheets

CAMERA SIMULATION SYSTEM

This application claims priority from U.S. provisional patent application Ser. No. 60/023,055, filed Aug. 2, 1996, which is incorporated herein by reference.

This invention was supported by grant numbers NSF CCR07966 and CCR96066 from the National Science Foundation. The U.S. Government has certain rights in this invention.

FIELD OF THE INVENTION

This invention relates to image rendering in computer graphics, and in particular to the use of camera-based models to synthesize a two dimensional image from data representing a radiant three-dimensional scene.

BACKGROUND ART

The rendering of images in computer graphics involves two processes: (1) the simulation of a radiant three-dimensional scene, followed by, (2) the rendering of the scene into a two-dimensional image which models a given image formation process. Although techniques for the simulation of the 3D scene have been rapidly developing, the 2D imaging process remains based primarily on the standard camera model (or pin-hole model) and the thin-lens-with-finite-aperture model.

These camera models can produce an image containing some photographic-like effects; however in order to keep computational complexity at a minimum they are highly idealized, and as a result not suitable for simulating the behavior of a particular physical camera and lens system. The pin-hole camera model is the most idealized. It results in an image which is focused everywhere on an image plane, regardless of each object's distance from the camera. Depth of field is just one of several physical camera properties which is obviously not found in this model (depth of field relates to the property that some objects are imaged in focus while others at different distances acquire blur). Further, since the pin-hole aperture is not finite, many rays which would be sampled in a physical camera with finite aperture are not sampled by the standard camera model. Thus many camera models which supplement the pin-hole model with some post-processing of the image in order to add realistic effects cannot properly model a physical camera and lens system. For example, Postmesil and Chakravarty, *Computer Graphics* (*SIGGRAPH '81 Proceedings*), volume 15, pages 297–305, August 1981, use post-processing to simulate depth of field. After sampling the scene with a pin hole camera model the authors apply a blurring technique to the resulting image.

The thin-lens-and-finite-aperture model introduced by Cook et al., *Computer graphics* (*SIGGRAPH '84 Proceedings*), volume 18, pages 137–145, July 1984, has become the standard in the computer graphics community. Thin lens camera models can exhibit more photographic effects than the pin-hole model and in particular account for some depth of field aspects quite naturally. However, this model remains highly idealized and additional features typical of physical cameras and lens systems are not adequately simulated by this model. For example, since the film plane is assumed to be in a fixed position parallel to the lens, the thin lens model cannot capture changes in field of view, depth of field, and exposure due to the relative movement of the image surface and lens system, as occurs during focusing, nor can it model the situations in which the film plane is not parallel to the lens system as in a view camera. In addition, the use of a thin lens approximation precludes several effects. In particular, this model cannot correctly simulate the geometry of image formation in order to produce an appropriate perspective projection for a specified thick lens system, nor can it exhibit a large variety of appropriate non-ideal lens behaviors including geometric aberrations (for example, barrel distortions produced by a fisheye lens).

In the prior art, approaches to non-ideal lens image formation such as Max, *Nicograph '83 Proceedings*, pages 137–159, December 1983, have relied on nonlinear mappings being applied to an image generated from a pin-hole model. The mappings are extrapolated from data fitting routines and other ad-hoc or empirical methods. Max used distortion data from the manufacturer of the Omnimax lens to derive a polynomial. The polynomial was used to warp ray directions in implementing a standard thin lens model (it is noted that ray tracing through the Omnimax lens was used by the manufacturer to generate distortion data). These approaches are limited to a specific lens and the precise correspondence between the simulated image and the physical image is questionable. In addition, this approach does not include depth-of-field effects nor reproduce abberations other than distortion.

In addition to proper geometrical image formation, radiometry is an important aspect of physical-camera image creation which is not properly considered in prior art. Previous techniques do not compute exposure correctly and in particular, neglect to account for levels and variation of irradiance across the film plane. Vignetting, the blockage of wide-angle rays by the lens system's stops, is also not accounted for in prior art camera models. The work by Cook et al., *Computer graphics* (*SIGGRAPH '84 Proceedings*), volume 18, pages 137–145, July 1984 lacks both of these physical camera features.

More increasingly there is a need for rendering images which are more realistic and closely resemble images created by use of a specified lens and camera system. For example in many applications (video special effects, augmented reality, etc.) it is desirable to seamlessly merge acquired imagery with synthetic imagery. For another example, in some machine vision and scientific applications it is necessary to simulate cameras and sensors accurately; a vision system may want to test whether its internal model of the world matches what is being observed. In both of these situations it is important that the synthetic imagery be computed using a camera model that closely approximates the real camera and lens system.

In spite of the utility of a physically accurate camera model, one does not find in prior art such a model. In particular one does not find a model which combines the physical principles of ray tracing to simulate non-ideal lens image formation with radiometric principles to accurately compute film exposure. Presumably, physically accurate camera models have not been implemented in prior art systems because no implementation was known that would avoid introducing unacceptable increases in computational complexity and expense.

OBJECTS AND ADVANTAGES

Accordingly, it is a general object of the present invention to provide a computer graphics rendering procedure that efficiently and accurately simulates the image that would be created by a specified physical camera and lens system. Several further objects and advantages of the present invention are:

(a) to provide a rendering procedure which simulates the physical geometry of image formation including non-linear lens behavior for a specific lens system.

(b) to provide a rendering procedure which correctly models the changes in geometry that occur in a specified camera system during focusing and other relative movement of lens and image surface and accounts for corresponding changes in field of view and depth of field.

(c) to provide a rendering procedure which computes image exposure at each pixel according to radiometric principles and, in particular, accounts for levels and variation of irradiance across the image plane and for vignetting.

(d) to provide a procedure which simulates the image formation of a specified camera and lens system in order to facilitate any number of applications which require either the seamless merging of or a detailed comparison between acquired imagery and synthetic imagery.

Further objects and advantages of the present invention will become apparent from a consideration of the drawings and ensuing description.

SUMMARY

The present invention is a method for modeling a physical camera in computer graphics systems. When given the manufacturer's specifications of the physical camera's lenses, including the dimensions and indices of refraction of its lenses, stops, and shutter characteristics, the location of the film surface relative to the lens system, and the orientation of the camera within the scene, the invention accurately and efficiently mimics the physical principles of image formation creating an image which approximates an image produced by the physical camera. The inventors have implemented this physical camera simulation with only a slight increase in computational expense compared with prior art techniques.

The camera simulation is implemented in a computer system. A three-dimensional radiant scene is stored in a memory of the computer system by a standard technique. The present invention is a procedure which transforms by processor means the radiant scene data into a two-dimensional image also stored by the computer in an array of pixels and available for viewing by a standard technique.

The procedure comprises four main elements:

(1) The geometric relationships between the lens system, object, and image surface are modeled by precise placement and movement of lens elements. This is necessary for accurate field of view and depth of field calculations.

(2) Image geometry is computed by using principles of geometric optics to trace the path of light through the camera and lens system. This ray tracing procedure is capable of simulating non-linear geometric transformations such as those produced by fisheye and anamorphic lenses, while simultaneously computing the correct exposure and depth of field.

(3) An exit pupil is calculated in order to define a region for efficiently sampling rays. Rays which connect an image point with the scene data are to be sampled, other rays which are blocked by stops are to be avoided.

(4) The image irradiance, or exposure at a pixel, is computed according to radiometric principles, applying accurate weighting to rays traced through the lens system, and using the appropriate exit pupil to control the limits of integration.

More specifically, the invention provides a method for rendering a synthetic two dimensional image of a three dimensional scene in a manner that accurately simulates a physical lens system. The method comprising the steps of:

(a) computing an exit pupil of the lens system;

(b) selecting a ray that passes through the exit pupil from a point on the image surface;

(c) tracing the ray through the lens system to determine an ultimate direction of the ray in object space;

(d) repeating steps (b)–(c) to obtain a first plurality of directions for a first plurality of rays;

(e) computing from the first plurality of rays and the first plurality of directions a selected second plurality of rays and a second plurality of directions;

(f) calculating radiance values for the second plurality of rays; and (g) combining the plurality of radiance values to compute an image value at each pixel.

DETAILED DESCRIPTION

Figure 1:
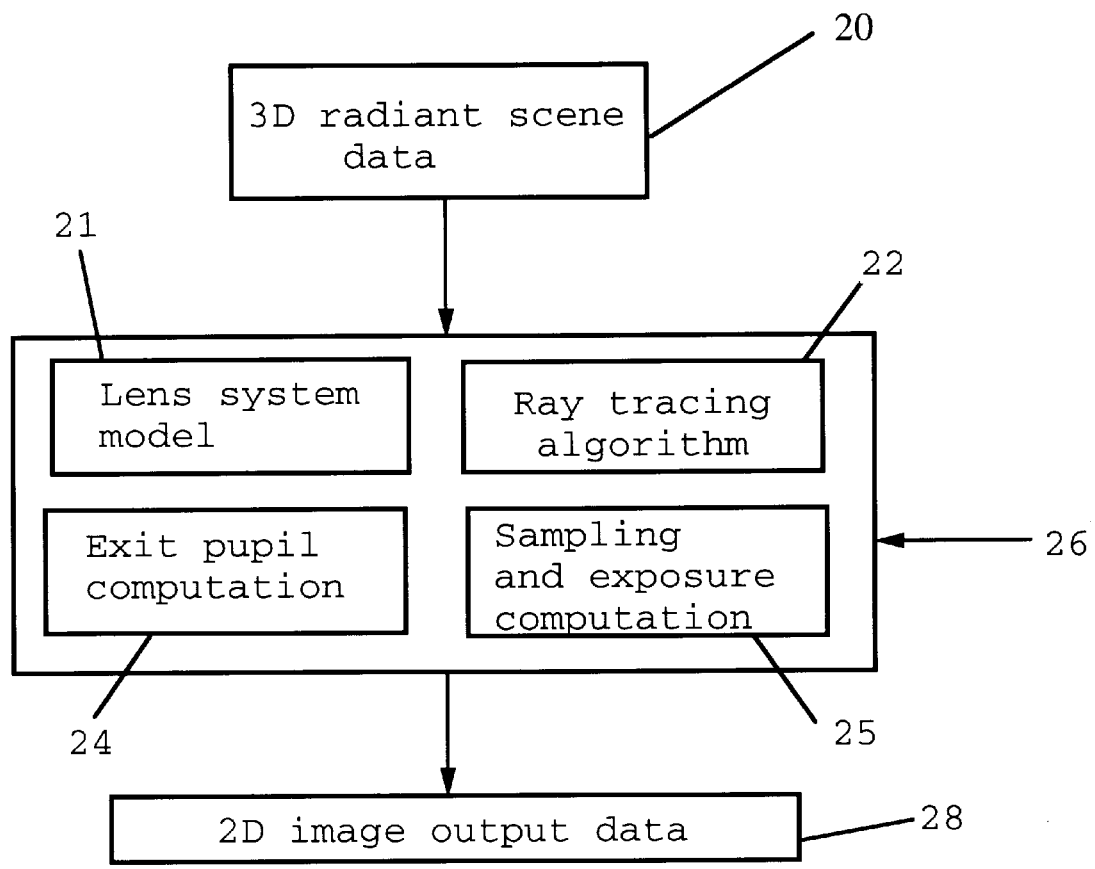
FIG. 1 is a block diagram of the present invention.

The schematics of the present invention are given in FIG. 1. Three-dimensional radiant scene data 20 are stored in a memory of a computer system by a standard technique. A camera model 26 is a procedure which transforms by processor means the radiant scene data into two-dimensional image data 28 stored by the computer in an array of pixels and available for viewing by a standard technique. Further, the resulting stored image accurately approximates an image created by a real physical camera with a specified lens, aperture configuration, shutter setting and film surface. The array of pixels is often referred to below as the film plane, in keeping with the invention's analogy to a physical camera system. In the preferred embodiment, the computer system comprises a graphics workstation comprising state-of-the-art microprocessors. The method described herein was implemented as a computer program, but may also be implemented as a custom hardware chip.

The camera model 26 contains four subunits: a lens system model 21, a ray tracing algorithm 22, an exit pupil computation 24, and a sampling and exposure computation 25. Each subunit is described in a separate section below.

The Lens System Model

Figure 2:
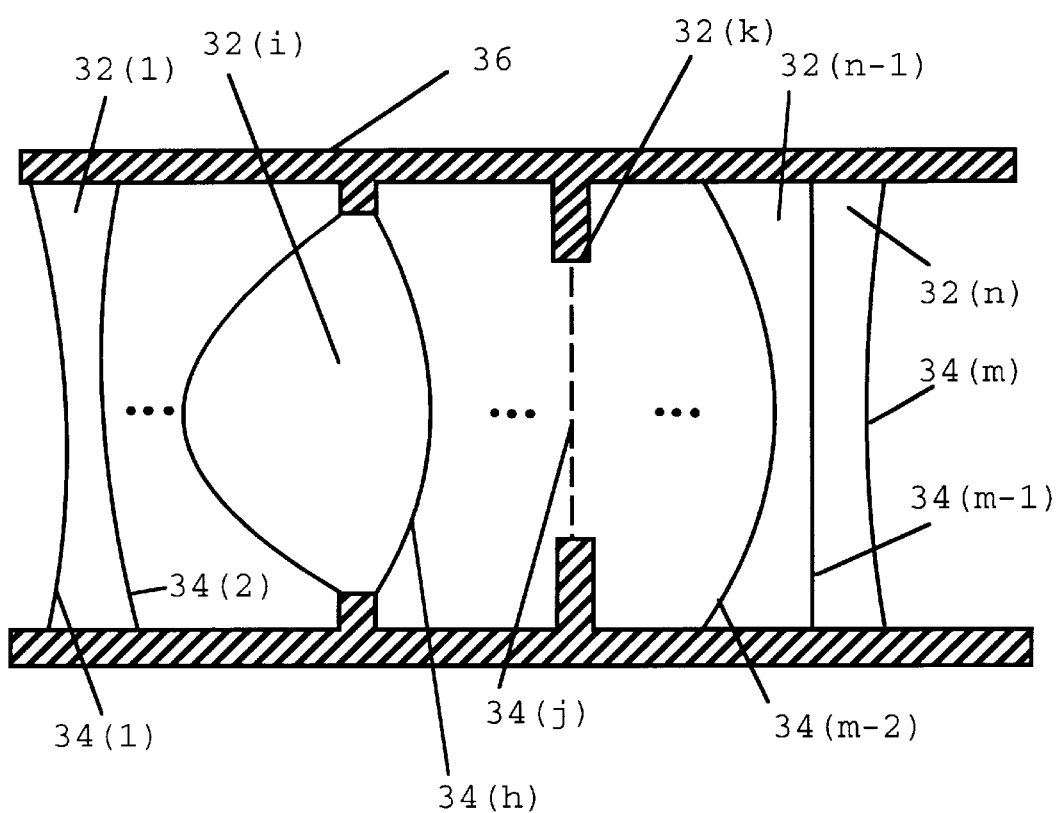
FIG. 2 is a cross section of a lens system which is simulated by the invention.

The lens system model 21 simulates a system made up of n elements: individual lenses and stops. FIG. 2 shows n elements, 32(1), ..., 32(i), ..., 32((k), ..., 32(n-1), 32(n) of the system to be modeled. The system is oriented so that a ray from the scene first enters the system through lens 32(1); the film plane is located to the right of the last lens element 32(n). The individual lenses are typically constructed from (although by no means limited to) glass or plastic. A stop is an opaque element which contains an aperture or hole (often circular). The stop which most greatly limits the angular spread of the bundle of rays that will pass unobstructed through a lens system is termed an aperture stop 32(k). The elements are contained in a housing 36 and are arranged centered on a common axis. The lenses and stops have m surfaces indexed 34(1), 34(2), ..., 34(h), ..., 34(i), ..., 34(m-2), 34(m-1), 34(m). The surface of a stop in the transparent aperture region is considered planar, as indicated by dashed lines in FIG. 2 for the aperture stop surface 34(j). It is not uncommon to find in a lens system that two or more lenses are cemented together and share a common surface. FIG. 2 shows one such example: surface 34(m-1) in this particular embodiment is shared by lenses 32(n-1) and 32(n). Specifications such as dimensions, indices of refraction and relative orientation of the elements are given in sufficient detail in order to implement ray tracing techniques described below. These specifications are consistent with the settings of the physical camera whose behavior is to be modeled; additionally, the aperture stop setting chosen is identical to the chosen setting on the physical camera, as is the distance between the lens system and film plane. The location and orientation of the model camera relative to the radiant scene is chosen to mimic the physical camera's position.

In order to model the focusing behavior of a camera, information on how the lenses move relative to the location of the film plane are specified. Focusing physical lens systems involves moving one or more lens elements along the axis in order to change the distance at which points are focused. For simple lenses, the housing and all of the elements are moved together, while in more complicated internal focusing lens systems, one or more elements may move independently. Moving a lens relative to the film plane has the additional effect of changing the field of view. As the distance at which the camera is focused decreases, the distance of the lens from the film plane increases and the field of view shrinks. This effect is not modeled in the prior art models, which assumes that the film plane is always located at the focal point and that the lens can be focused at any arbitrary distance without any change of configuration.

The lens system as described above encompasses many manufactured lens systems. Systems specified by tabular data which typically present the curvature, thickness, index of refraction, V-number, and diameter of each lens are especially well suited to be modeled. However it should be evident to anyone skilled in the art that many lens systems which deviate from the above description can too be modeled by the procedure described below.

For example, if one wishes to model defects in a specified camera system, such as mis-aligned lens elements which do not lie along a common axis, then the procedure described below works with little or no modification. Similarly, if the film surface is nonplanar, one skilled in the art can readily adapt the following procedures for this situation.

Ray Tracing Algorithm

One robust, accurate and well-known method to predict how a lens will form an image is to trace (computationally) rays of light through the system. In our figures, we follow the convention of drawing object space to the left of the lens system, image space to the right, with coordinates along the axis increasing from left to right. Distances in the lens system are signed quantities, with a distance measured from left to right being positive, and right to left negative. Unprimed variables are in object space, primed are in image space.

An algorithm for tracing a ray through the lens system (in the direction opposite to the direction traveled by light) is given by R=Ray (traversing lens system from right to left).
For each element surface 34(h) from rear to front,
    p=intersection of R and surface 34(h).
    If p is outside clear aperture of 34(h) ray is blocked.
    Else if the medium on the far side of the surface 34(h)
        differs from medium on near side then compute new
        direction for R using Snell's law.

Thus the propagation of a ray through a lens surface involves both finding the point of intersection between the ray and the surface and finding the refraction of the ray as it crosses the interface between the two media. In the preferred embodiment of the ray tracing algorithm, as the ray approaches each lens element the following steps are considered:

1) If the lens' geometry can be adequately approximated by making a thick lens approximation (as discussed below) then implement the corresponding 4×4 projective transformation (also discussed below; see equation 02) by processor means.

2) Otherwise the ray tracing algorithm is implemented for each element of any shape for which standard intersection and normal-finding routines can be written; the computations are particularly well-known and easily implemented if the lens has spherical or planar surfaces.

Implementing step 2 for all elements can result in an image of the same or higher quality, although possibly accompanied by an increase in computation time.

Figure 3:
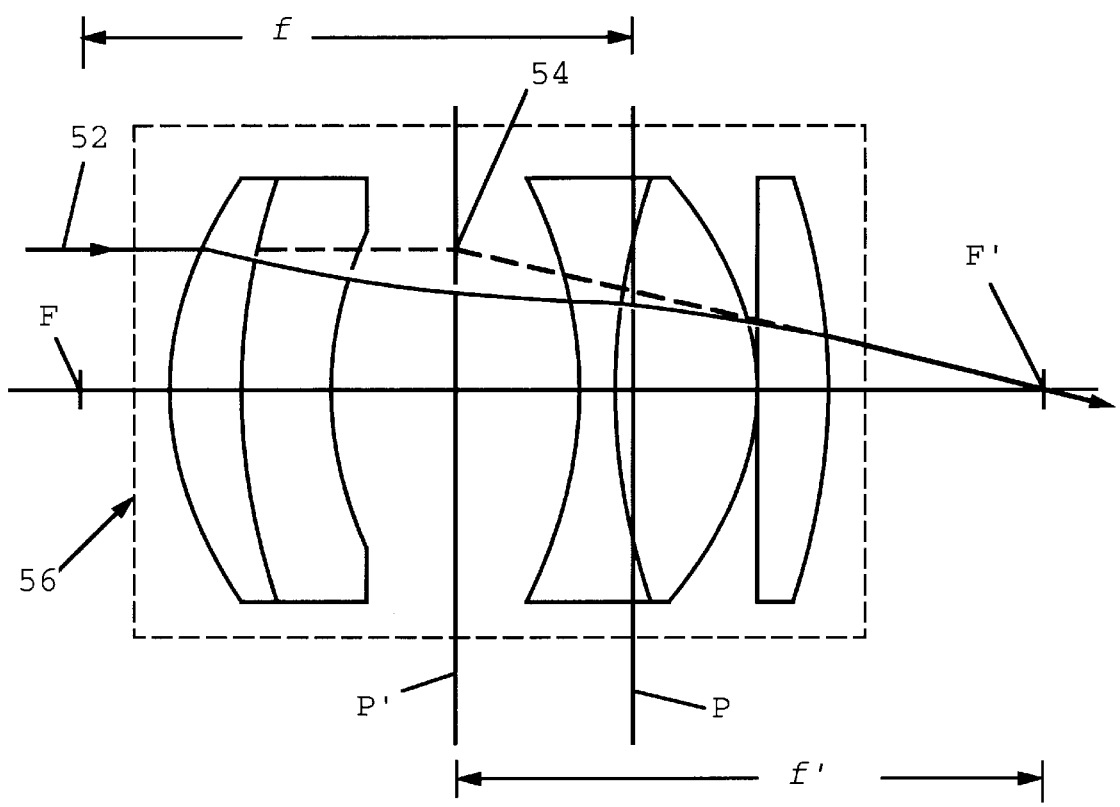
FIG. 3 is a cross section of a lens system which is used to illustrate a thick lens approximation.

An elaboration on the thick lens approximation (a well-known optics concept) of the preceding step 1 follows. A thick lens can be either a single lens or a system of lenses whose net behavior is to be described by the thick lens approximation. FIG. 3 depicts a lens system 56, referred to hereafter as a thick lens. A thick lens maps each point in object space onto a single point in image space and all points in the plane of focus map onto the image plane with uniform magnification. This step then is preferably applied to a lens which approximates these properties (lenses such as a fish eye for example are preferably handled with step 2). The behavior of a thick lens 56 can be characterized by its primary focal point F, a secondary focal point F', a primary principal plane P and a secondary principal plane P', which are illustrated in FIG. 3 and discussed further in standard optics textbooks. An axis-parallel ray 52 from a point at infinity in object space will enter the lens, be refracted through it, and emerge with a new direction and intersect the axis at the secondary focal point, F'. A point 54 at which the incident ray and the emergent ray would intersect defines the secondary principal plane P'. P' is an imaginary surface normal to the axis at which we assume refraction to have occurred. Similarly, an axis-parallel ray from image space intersects the axis at F, the primary focal point, and the intersection of the original and refracted rays define P, the primary principal plane. The signed distance from P' to F' is the effective focal length of the lens, f, and is equal to −f when both object and image space are in the same medium.

Unlike the thin lens model usually used in computer graphics, the principal planes are not assumed to coincide. The distance from P to P' is the lens' effective thickness, and may be negative, as for the lens in FIG. 3. Although a thin lens approximation can be valid if the thickness is negligible, the thickness of photographic lenses is usually significant.

To find a thick approximation to the 32(i) element (or in alternative embodiments to a group of elements or the entire lens system), the above definitions of focal points and principal planes are applied directly. Rays are traced through the lens system from each side and the appropriate points of intersection are found to define P, F, P', and F'. (Alternative embodiments include finding these values by using the various thick lens formulas, which provide an analytical means for deriving a thick lens from a collection of simple lenses. The advantage of the first preferred method is that it yields a more accurate approximation to the lens because typical lens systems are designed to exhibit ideal image formation even though the individual elements are less than ideal.)

The geometry of image formation by a thick lens may be realized by a projective transformation defined by the focal points and principal planes (Born and Wolf, Principles of Optics, 1964). Given a point in object space at a signed distance z along the axis from P, the conjugate equation holds that $$\frac{1}{z'} - \frac{1}{z} = \frac{1}{f'}, \quad (01)$$

where z' is the axial distance from P' to the point's image in image space. This equation and some simple geometry can be used to find the image of a point on either side of the lens. However, the resulting equations are inconvenient in that z and z' are measured from different origins. If the origin is assumed to be at P and both distances are measured from it, the same equations apply, except that z' must then be translated by t=P'−P, the thickness of the lens. The total transformation can be written as a 4×4 matrix:

$$\begin{bmatrix} X' \\ Y' \\ Z' \\ W' \end{bmatrix} = \begin{bmatrix} 1 & 0 & 0 & 0 \\ 0 & 1 & 0 & 0 \\ 0 & 0 & 1+\frac{t}{f'} & t \\ 0 & 0 & \frac{1}{f'} & 1 \end{bmatrix} \begin{bmatrix} x \\ y \\ z \\ 1 \end{bmatrix}. \quad (02)$$

Note from the form of equation (02) that the thick lens approximation used in the present invention may be easily adapted for use in conventional rendering systems that use 4×4 perspective transformations to render images, including scanline and zbuffer systems implemented in hardware or software. Thus it is apparent that generalizing to thick lens systems may be implemented with virtually no increase in computational complexity. Additionally note that when t is zero, the above transformation is identical to the usual thin lens transformation used in computer graphics (see the textbook by Rogers and Adams, Mathematical Elements for Computer Graphics, 1990). Traditional graphics systems use the t=0 thin lens transformation and the inventors are not aware of any prior art which incorporates the thick lens transformation (02).

Rather than computing the direction of a ray using the ray tracing procedure directly, ray tracing can alternatively be used to define a function that accurately approximates the way in which rays are acted upon by the lens system. This approximating function can then be used to determine the direction of all rays on the far side of the lens, with an accompanying decrease in computational expense. This is particularly practical in symmetrical lens systems, wherein the results of tracing one ray through the lens system can be used to determine the directions of many other rays. As with the ray tracing procedure, this approximation function maps each ray on one side of the lens system to another ray on the far side.

Figure 9A:
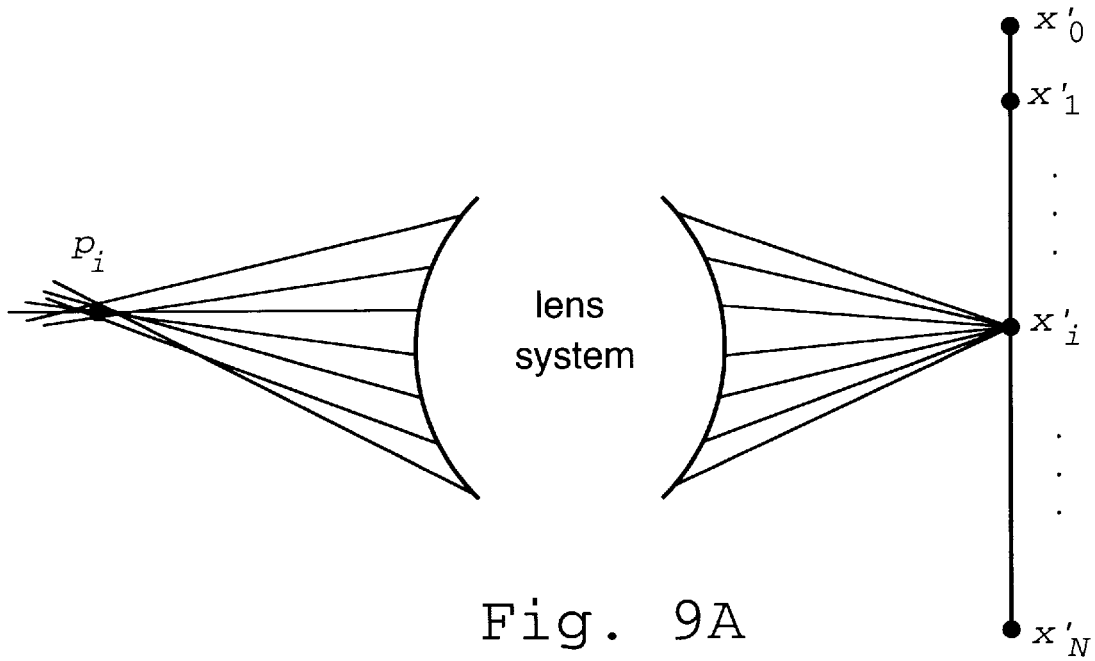
FIGS. 9A and 9B show diagrams illustrating a method for approximating a lens system's behavior through the use of an approximating function.
Figure 9B:
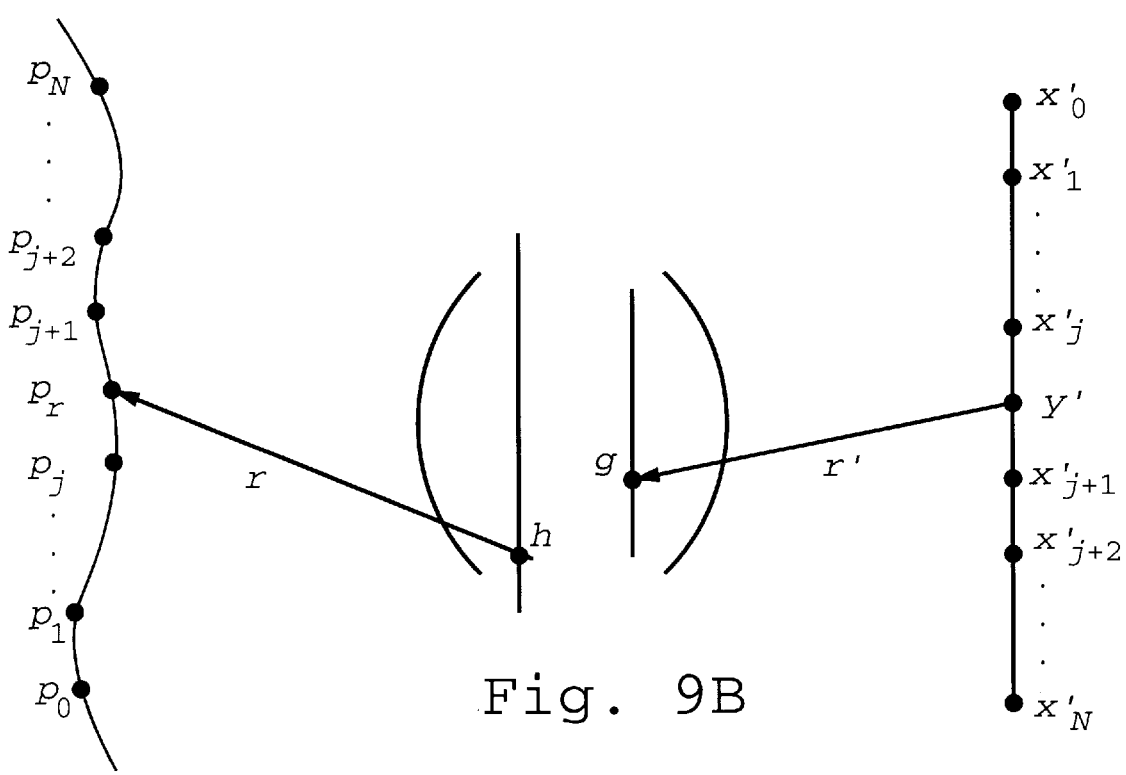

One such approximation function is a thick lens approximation. As described above, one can derive a thick lens approximation to the entire lens system by tracing a small number of rays through it. (See FIGS. 9A and 9B.) This thick lens approximation is subsequently used to determine a point in object space through which a given ray passes. The origin of this resulting ray can be approximated by translating the original ray's intersection with the exit pupil g to a corresponding point on the entrance pupil h, and by further scaling the radial position of h on the entrance pupil by the ratio of the entrance pupil size to the exit pupil size.

Another approach to approximating the lens system's behavior is to trace rays through the system from a number of different points on the image surface, and to then define an approximating function that interpolates the resulting ray directions. In particular, one such function can be defined by assuming that all rays from a given point on the image surface essentially pass through a single point in object space, regardless of where any ray intersects the exit pupil. This assumption is typically quite valid for photographic lenses, which in most cases form reasonably sharp images, and makes it possible to accurately reproduce the distortion and field curvature aberrations exhibited by the lens system being modeled.

The approximation function is then defined as follows: For each position $x_i$ of a number of positions $x'_0, \ldots, x'_N$ on the image surface, many rays are traced through the lens system, and a unique point of focus $p_i$ for the resulting rays is determined, as shown in relation to FIGS. 9A and 9B. Subsequently, when the ultimate direction of a different ray r' is to be determined, its point of intersection, y', with the film surface is first determined. Next, the set of focus points corresponding to points $x_j, \ldots, x_{j+k}$ in close proximity to y is used to interpolate a new focus point $p_r$. This focus point and the ray's intersection with the exit pupil, which may be found as in the thick lens case, defines the resulting ray r.

Further accuracy may be had by additionally computing the shape and location of the exit pupil for the bundle of rays traced from a given image surface point. This exit pupil shape and location information is then interpolated by means similar to that described above when mapping from a point on the exit pupil to the entrance pupil.

If a radially symmetric lens system is used, the points xi need only be generated along a single line perpendicular to the axis of the lens system, resulting in a large reduction in computational expense. To determine the ultimate direction of a ray r' that does not intersect this line, r' can be rotated about the lens axis so that it does intersect this line, and the above procedure applied to compute a resulting ray r.

Finally, r is then rotated about the lens axis in a matter exactly opposite to that previously applied, resulting in the object-space ray corresponding to r'.

The unique focus point p for a bundle of rays can be found in a number of ways. In the preferred embodiment, x is found by solving:

A p=b where $$A = \sum_{i=1}^{N} I - w_i w_i^T$$

$$b = \sum_{i=1}^{N} (I - w_i w_i^T) o_i$$

$w_i$ is a vector giving the normalized direction of the $i^{th}$ ray $o_i$ is a vector giving the origin of the ith ray and I is the identity matrix.

It will be obvious to one skilled in the art that analogous approximating functions may be defined by tracing rays in the opposite direction, i.e. from object space to image space, with the roles of exit pupil and entrance pupil reversed and points on the image surface replaced by points in object space.

Exit Pupil Computation

Figure 4:
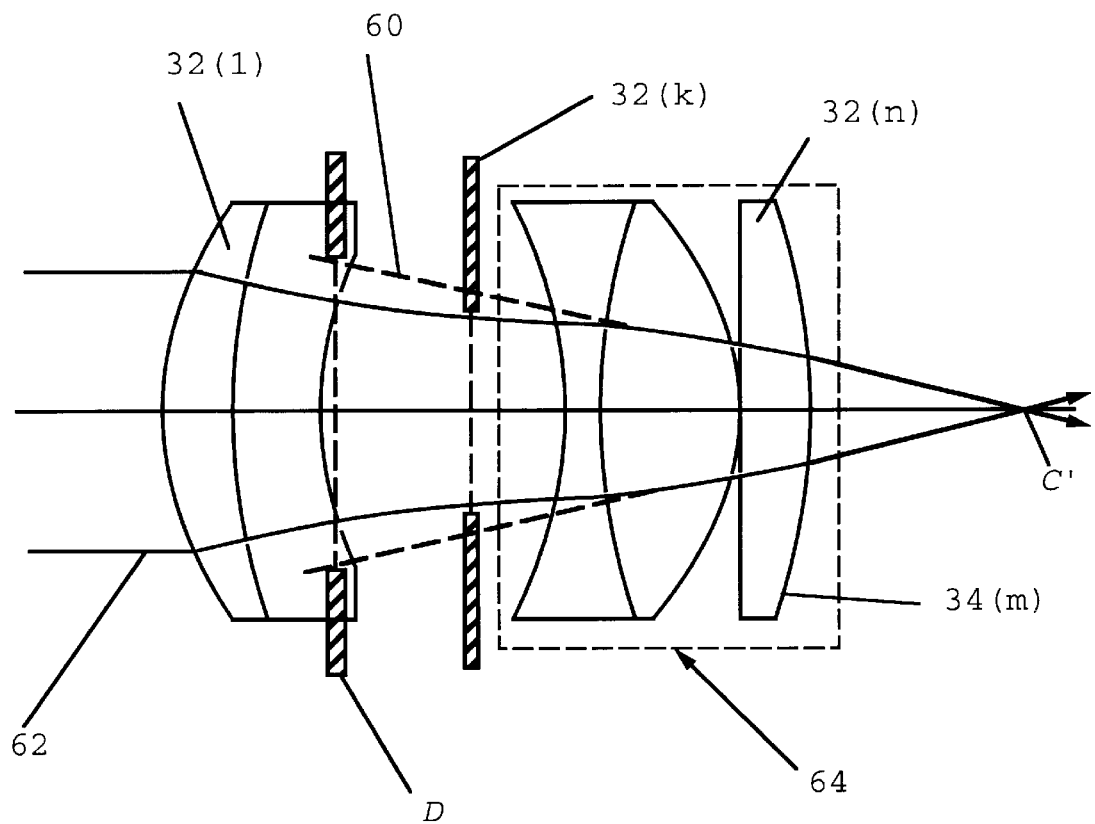
FIG. 4 is a cross section of a lens system which illustrates the difference between an exit pupil and an aperture stop.

To compute exposure at a pixel on the film plane, it is necessary to consider or sample rays which connect points within the pixel to points on the radiant scene. Failure to sample these rays will give incorrect results while sampling other rays is inefficient. The computation of the exposure at the pixel is therefore done by considering only rays, such as ray 62, which pass through an exit pupil labeled D in FIG. 4 (the exit pupil is a common optics concept). A cone 60 has apex located at a point within the pixel and is bounded by the exit pupil aperture. Rays which are contained in the cone 60 define the directions from which scene radiances exit the lens system and impinge upon the image plane point. Rays which do not pass through the exit pupil are blocked by the lens system, and cannot define directions from which scene radiances arrive. In computer graphics, it is standard practice to use the aperture stop 32(k) rather than the exit pupil for ray sampling. If the aperture is smaller than the exit pupil, however, sampling the aperture will result in too small exposure values and the image will have too great a depth of field. If on the other hand the aperture is larger than the exit pupil, either rays will be traced through the system which eventually get blocked resulting in inefficient computations or the exposure values will be too large and the depth of field too narrow.

The exit pupil in this embodiment is found as follows: Consider an axial point C' on the film plane. For each potential stop, determine its apparent size and position from the axial point C' on the film plane. This is done by imaging the stop through those lens elements that fall between the stop (in FIG. 4 the stop shown is the aperture stop 32(k) and its image is D) and image space. Then determine which image disk subtends the smallest angle from the axial point on the image plane. This image disk is the exit pupil. The image of a given stop can be computed using a thick lens approximation to the appropriate subsystem of elements (for example, apply the thick lens approximation to subsystem 64 when imaging the aperture stop 32(k)). This approximation is accurate to the extent that, for the physical lenses being modeled, the exit pupil is a reasonable approximation to the actual image of the aperture stop as viewed from off-axis points. Further, for off-axis image points, some rays directed towards the exit pupil will be vignetted (i.e., it is not necessarily true that this procedure is 100% efficient, only that it is more efficient than using larger regions such as the hemisphere or area of the last element 32(n)).

If each group of lens elements does not sufficiently exhibit ideal image formation, then the exit pupil is defined to be the surface 34(m) of the rear-most lens-element. More precise calculations of the exit pupil, say for each non-axial point, can also be implemented at additional cost (which ultimately is not necessarily more expensive than defining the exit pupil as the surface of the last lens 34(m)).

Figure 5:
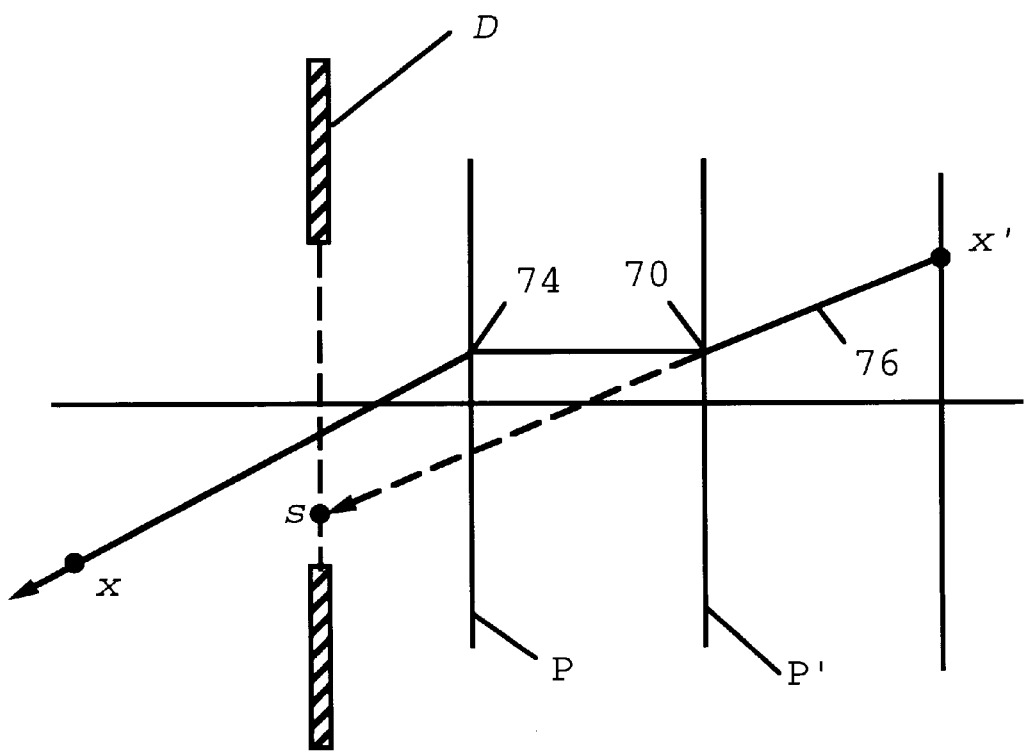
FIG. 5 is a cross sectional view of a ray tracing procedure through a thick lens.

It is emphasized that the image of the aperture rather than the aperture itself, is to be considered when using a thick lens in a rendering system. Cook et al., *Computer Graphics (SIGGRAPH '84 Proceedings)*, volume 18, pages 137–145, July 1984 describe an algorithm for tracing rays through a thin lens by selecting a point on the aperture stop and then tracing a ray from that point through the image of the current point on the image plane. As noted above, using the aperture stop rather than the exit pupil can lead to errors and inefficiencies. The process of tracing a ray through a thick lens with an exit pupil D is illustrated in FIG. 5. To trace a ray 76 from an image point x' through a thick lens, a point S on the exit pupil is chosen. A point 70 of intersection of a ray from x' to S with P' is found, and then translated parallel to the axis to a point 74 on P. A ray from 74 through x, the image of x', is then used to sample the scene. The image of x' is found using equation (01).

Those skilled in the art will recognized that the entrance pupil may be computed in an manner entirely analogous to the above described method for computing the exit pupil.

Sampling and Exposure Computation

I. Exposure.

Figure 6B:
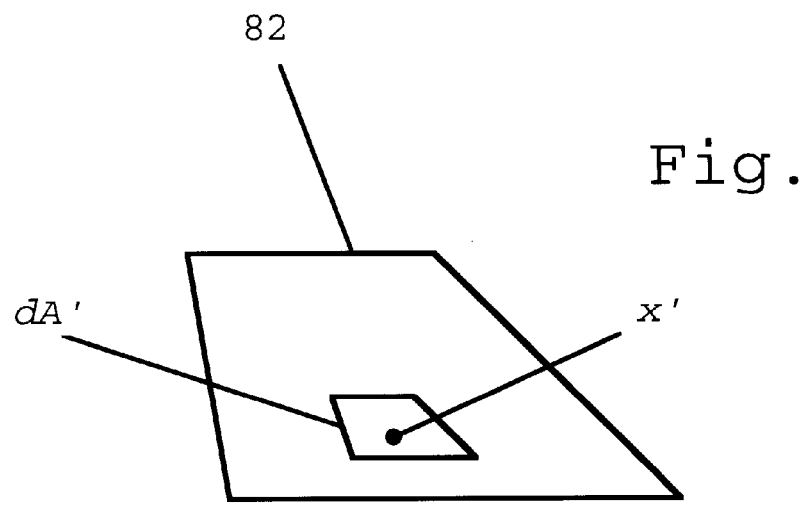
FIG. 6b shows a close up of a pixel which has a point x' lying in a small area element dA'.
Figure 6A:
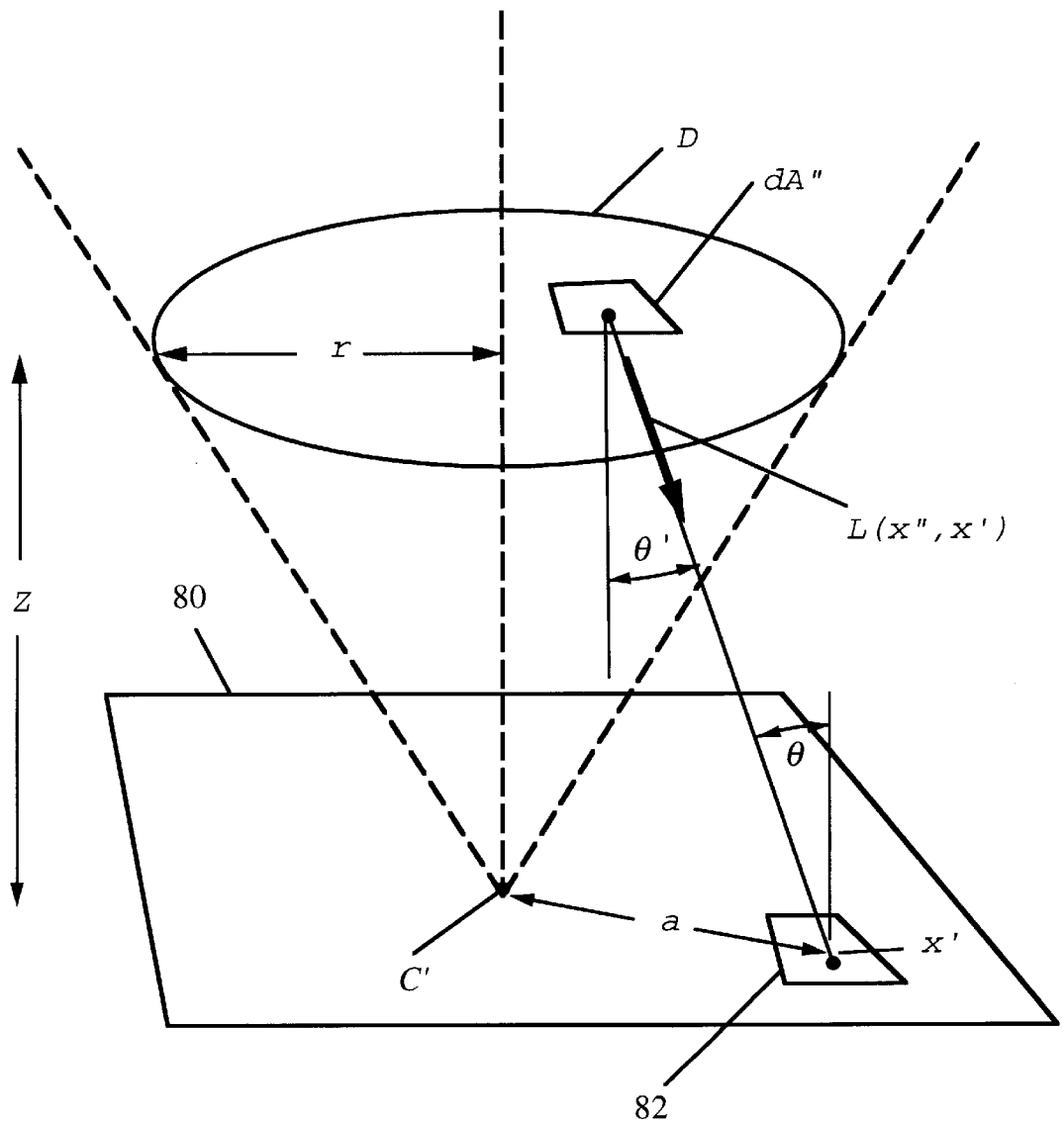
FIG. 6a illustrates an exit pupil and the film surface geometry which is used in describing the computation of the exposure of a pixel.

The description of the computation of exposure which makes reference to FIG. 6a and FIG. 6b now follows. The response of the film plane 80 (FIG. 6a) at a point labeled x' (FIGS. 6a and 6b) is a function of the exposure H(x'). The exposure H(x') is the integral of the irradiance on the point x' in the film plane over the time that the shutter is open. For this embodiment the irradiance is taken to be constant over the exposure period so that H(x') has a simple form, $$H(x')=E(x')T, \quad (03)$$

where E(x') is the irradiance at x' and T is the exposure duration time. Parameter T is chosen to match the physical camera's exposure setting. If more detailed knowledge is available as to the precise time and spatial dependent behavior of the shutter, then equation (03) could be readily modified to incorporate this feature. Additionally, exposure is also a function of wavelength, and (03) must be evaluated at multiple wavelengths. In general this wavelength dependency will also affect the path of a ray through the lens system, because the index of refraction varies with wavelength. More generally, irradiance is also a function of time. In this case, rays are also distributed over time, as well as space and wavelength.

To compute E(x'), the radiance is integrated, by a means described below, over the solid angle subtended by the exit pupil disk, which is labeled D in FIG. 6a:

$$E(x') = \int_{x''\in D} L(x'', x') \frac{\cos\theta''\cos\theta'}{\|x''-x'\|^2} dA''. \quad (04)$$

L(x",x') is the radiance along the ray from x" to x', a well-know quantity, and can readily be evaluated from the ray tracing algorithm and radiant scene data by standard computer graphics methods. Variables θ, θ", dA" are illustrated in FIG. 6a.

If the film 80 is parallel to the disk D, equation (04) can be rewritten as $$E(x') = \frac{1}{Z^2} \int_{x''\in D} L(x'', x')\cos^4(\theta') dA'', \quad (05)$$

where Z is the axial distance from the film plane to the disk. Note that for modeling view cameras where the film is not necessarily parallel to the disk, equation (04) should be used. Equation (05) differs from Cook et al., *Computer Graphics* (*SIGGRAPH '84 Proceedings*), volume 18, pages 137–145, July 1984 which assumes each ray has the same weight. The weighting in the irradiance integral leads to variation in irradiance across the film plane due to the lens system and is a very real feature of physical cameras.

There are two simple analytical ways to estimate equation (05):

1. If the exit pupil subtends a small solid angle from x', θ' can be assumed to be constant and equal to the angle between x' and the center of the disk. This allows us to simplify equation (05) to:

$$E(x') = L\frac{A}{Z^2}\cos^4\theta', \quad (06)$$

where Z is the axial distance from the film plane to the disk, A is the area of the disk, and L is the integral of L(x",x') over all x" points. If Z is assumed to be the focal length, (06) can be written $$E(x') = L\frac{\pi}{4}\cos^4\frac{\theta'}{n^2} \quad (07)$$

where n is the f-number of the lens.

2. For larger solid angles, a more accurate way to estimate the variation in irradiance is to compute the differential form factor from a point on the film plane to a disk. This correctly accounts for the finite size of the disk, and the variation in angle as we integrate over the disk. This integral may be computed analytically (Foote, Scientific paper 263, Bulletin of the Bureau of Standards, volume 12, 1915):

$$E(x')=L\pi F, \quad (08)$$

where F is $$F = \frac{1}{2}\left(1 - \frac{a^2 + Z^2 - r^2}{\sqrt{(a^2+Z^2+r^2)^2 - 4r^2a^2}}\right), \quad (09)$$

and a is shown in FIG. 6a.

When (06) (07) or (08) are used, the same weighting value can be applied to the radiances associated with a number of rays in close proximity on the image surface. For example, a single weight can be computed for a point x' at the center of a pixel, and that same weight can then be applied to all radiance values computed within that pixel.

Vignetting is the blocking of light by lens elements other than the aperture stop when a ray passes through the system at a large angle to the axis. This is an especially significant effect in wide-angle lenses and when using a lens at full aperture. The simple prior art camera models do not account for this effect at all. However, the ray tracing algorithm of the present invention accounts for this blockage, and hence the exposure is computed correctly. Note, however, that the analytic formulas (06), (07) and (08), which are not necessary to implement the invention, but result in more efficient computation, tend to overestimate the exposure for a real lens system and should be used with care.

When an approximation function is used to describe the behavior of the lens system, blockage due to vignetting must be accounted for separately, since the ray tracing procedure cannot be used directly to determine if a ray is vignetted. To approximate the effects of vignetting in such cases, a number of rays can be traced from multiple points on the film surface in a preprocessing step, and the fraction of those rays that are not vignetted recorded. This vignetting information is then interpolated, in a manner similar to the focus point interpolation, for each new ray that is cast, and the ray's radiance multiplied by this interpolated fraction. Further accuracy may also be had by using this vignetting fraction as a further scaling factor when mapping a ray's intersection on the exit pupil to a point on the entrance pupil. When this is done, a vignetted cone of rays in image space will have a smaller cross-section in object space, as expected.

II. Sampling.

The image to be rendered is composed of an array of pixels. The value of a pixel 82 is a function of the radiant power falling on a hypothetical pixel-sized sensor in the film plane. The radiant power is given by integrating H(x') over the pixel area 82. In light of equation (04) this is equivalent to an integration over a four-dimensional domain of pixel area and exit pupil area. This is estimated by sampling radiance over this domain.

Figure 7:
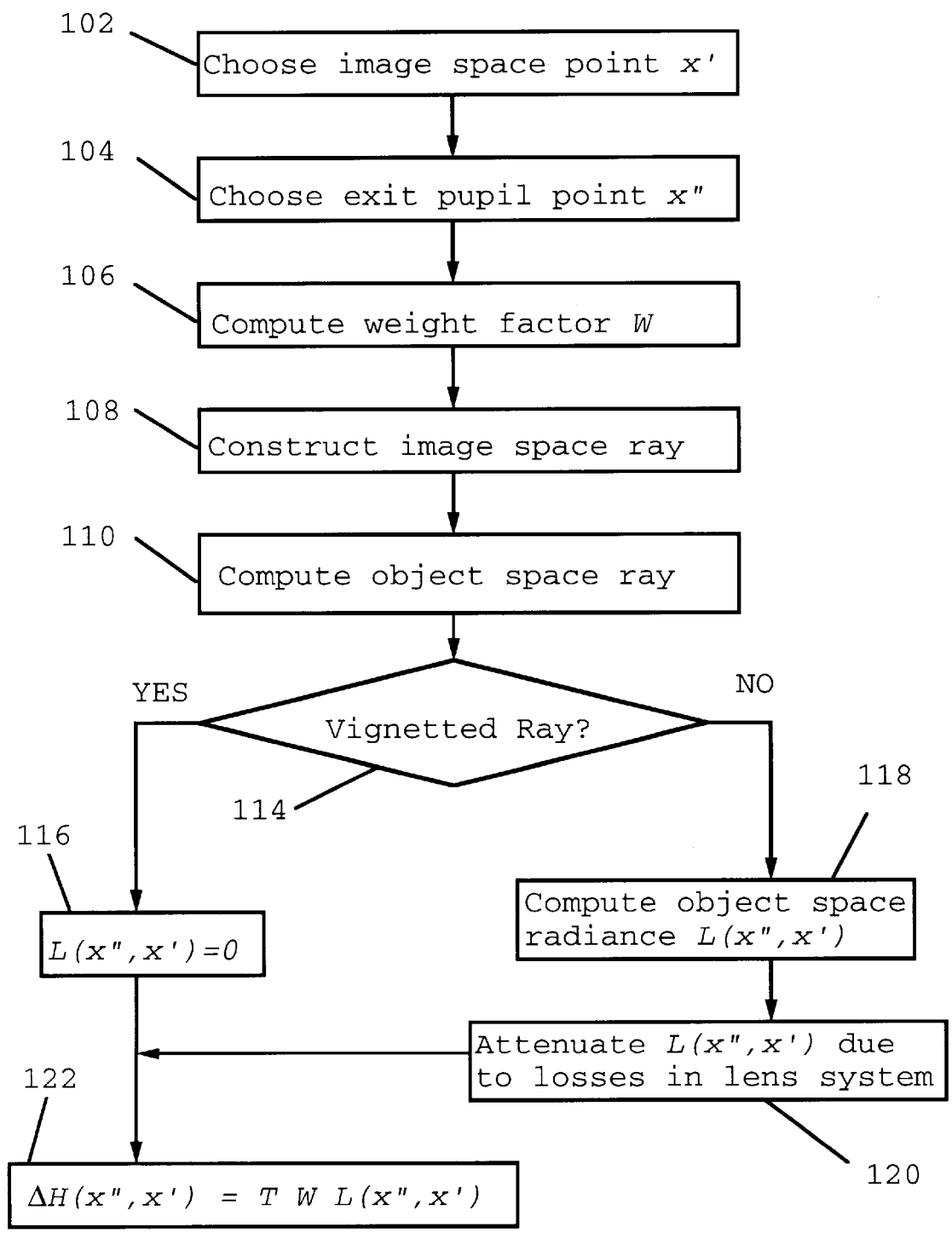
FIG. 7 is a flow chart illustrating ray sampling procedure used to compute exposure at a pixel.

A flow chart in FIG. 7 depicts the procedure implemented in performing a single sample. Sampling consists of first choosing (102) a point x' in the pixel area and then choosing (104) a point x" in the exit pupil. Once this is done a weight factor W is computed (106). Formally W=cosθ"cosθ'/∥x"−x'∥²dA"dA' and can be computed by dividing the exit pupil area into many small areas dA" where x" is in one such dA", as well as dividing the pixel area into many small areas dA' where x' is in one such dA' (as typically done to estimate an integral; see FIG. 6b). The weighting term cosθ"cosθ'/∥x"−x'∥² can be approximated when appropriate by implementing one of the equations (06), (07), or (08). Equations (06) and (07) assume small solid angle and therefore that W is the same for each x". Equation (08) can be used when the exit pupil is relatively larger and L(x",x') does not vary much as a function of x'. After computing W the ray tracing algorithm is applied to construct (108) a ray from x' to x", and then compute (110) the ray from x" to the scene data. If the ray is vignetted (114), then it does not contribute to the exposure integral and L(x",x')=0 (116). Otherwise, the object space radiance L(x",x') is computed (118) (a standard computation); at this point the radiance L(x",x') can be attenuated to account for losses in the lens system (120) (it is straightforward to account for non-unit transmittance while tracing a ray through a lens system). If vignetting information is being interpolated, rather than evaluated directly by the ray tracing procedure, the radiance is scaled by an interpolated vignetting fraction, as described above. Finally (122), the delta-exposure value ΔH(x",x') of the sample is computed ΔH(x",x')=T W L(x",x'), where T is the exposure time.

The most obvious way to compute the single exposure value for the pixel is to sum sample values ΔH(x",x') over the pixel area and exit pupil area. However, there are several ways to improve the efficiency of this calculation and quality of the resulting image. First, as noted already, sampling within the solid angle subtended by the exit pupil rather than sampling radiance over a larger region (such as the whole hemisphere) improves efficiency; in this way many rays which do not contribute to the radiance are not sampled. Secondly, the use of good sampling patterns can reduce the amount of error in a pixel as well as affect the overall distribution of noise in the final image.

Figure 8:
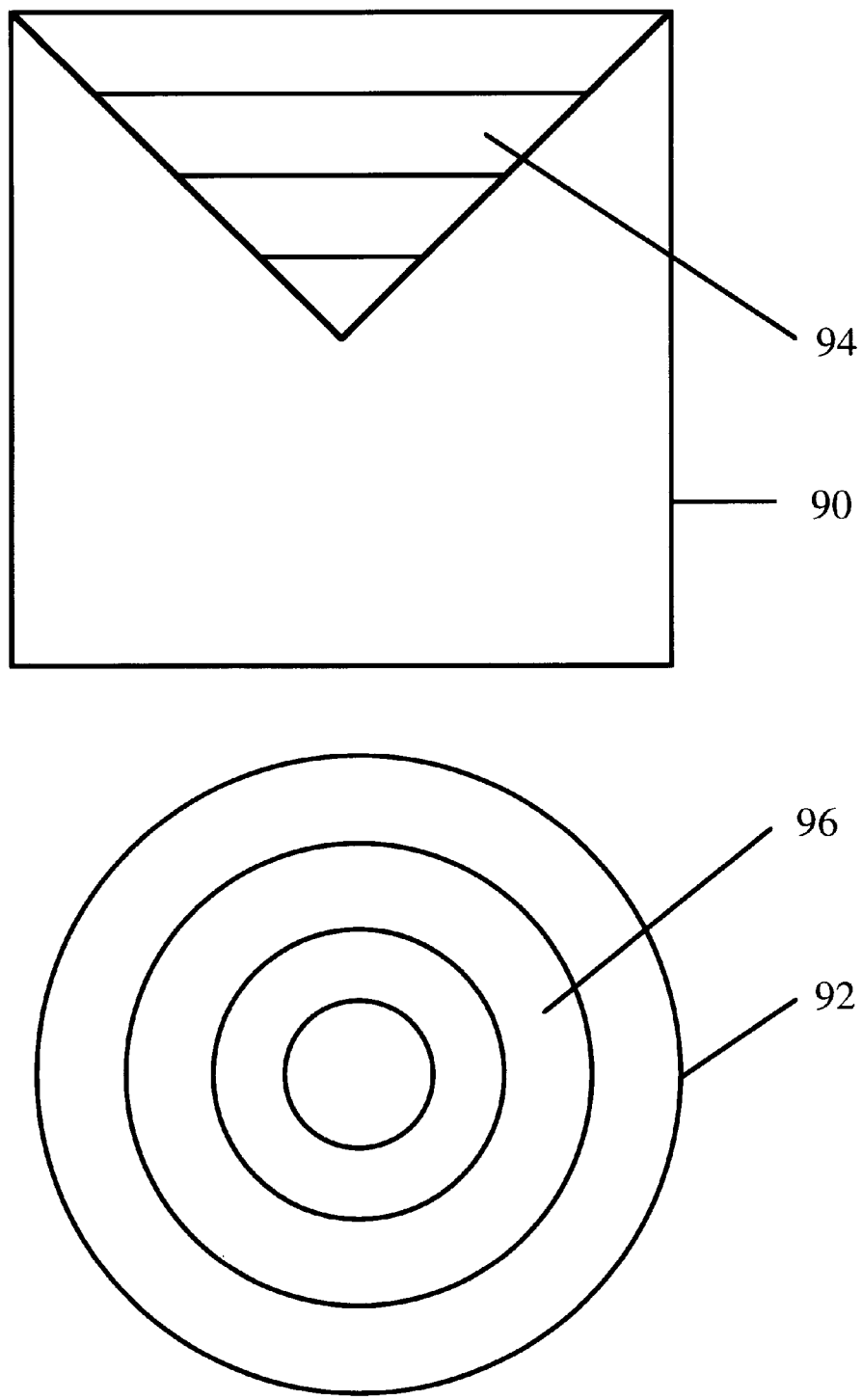
FIG. 8 is a square domain (above) which gets mapped to a circular domain (below) for the purpose of generating sampling patterns used in computing exposure of a pixel.

There exists a large body of sampling theory which may be implemented. However implementation of the preferred embodiment proceeds as follows. The four dimensional domain of pixel area and exit pupil area is mapped to a hypercube $[0,1]^4$. Two dimensions of the pixel area are translated and scaled appropriately, while the remaining two dimensions of the hypercube (a unit square) are mapped to the exit pupil. The mapping from the unit square to the exit pupil disk is preferably measure preserving (has a constant Jacobian) in order to avoid introducing sampling bias. Thus uniformly distributed points in the square map to uniformly distributed points on the disk. There are a number of such mappings. However, when mapping special sampling patterns such as stratified patterns it is good to choose a mapping that does not severely distort the shape of the strata. The obvious mapping, $$\rho = \sqrt{u}, \quad \alpha = 2\pi v,$$

is actually rather poor in this respect (u, v are coordinates on the unit square and ρ, α are on the disk). The preferable mapping, is given by Shirley, *Eurographics '91 Proceedings*, June 1991, and takes concentric squares 94 of the unit square 90 to concentric circles 96 of the disk 92 (see FIG. 8). For example in one wedge of the square, the mapping has the form:

$$u' = 2u - 1, \quad v' = 2v - 1,$$
$$\rho = v', \quad \alpha = \frac{u'}{v'}.$$

Other mappings obviously exist; for example, an alternative mapping takes subrectangles [0,u]×[0,1] to a chord with area proportional to u.

After the domain has been mapped to the hypercube, a sampling pattern on the hypercube is chosen. One choice is pseudo-random stratified sampling, dividing the dimensions of the hypercube into blocks and placing a sample randomly within each block. Given N samples, we could divide the hypercube into $N^{1/4}$ strata along each dimension. For typical values of N (it is unusual for a distributed ray tracer to cast more than a few hundred rays per pixel), this does not amount to many divisions of each dimension, and the benefits of stratification would be small. Instead, it is preferable that the pixel-area dimensions and the exit pupil area dimensions are stratified separately as $N^{1/2}$ by $N^{1/2}$ grids on subsquares.

This gives reasonable pixel antialiasing where image edges are in sharp focus, and good distribution of noise in regions where depth of field causes blur. To avoid systematic noise, the correlation of strata between pixel area and disk are randomly permuted.

Another choice for a sampling pattern is importance sampling. Rather than generating uniformly distributed points on the lens and weighting them, rays are generated with a cosine-weighted distribution in solid angle, $\cos\theta''\cos\theta'/\|x''-x'\|^2$, and then the unweighted radiance values are used. Importance sampling adds to the complexity and expense of the sampling operation but is an effective means of reducing noise in the final image, particularly when the pupil subtends a large solid angle from points on the image surface.

Another sampling technique is to generate quasirandom sample positions, such as Hammersley points (Niederreiter, Quasi Monte Carlo methods, *Bulletin of the American mathematical Society*, November 1978). In four dimensions, the ith point out of N points is of the form $$\left(\frac{i}{N}, \phi(i,2), \phi(i,3), \phi(i,5)\right),$$

where φ(i,r) is the radical inverse which maps an integer i to a real value by reflecting its digits (base r) about the decimal point. Thus φ(1955,10) would be the number 0.5591. The standard practice of quasi Monte Carlo integration is to generate a pattern of N points and use that same pattern to integrate over pixels, trying to lower the error of our pixel estimation. Stratified sampling actually does a better job of reducing sampling error (Dobkin and Mitchell, *Proceedings of Graphics Interface* '93, 1993); however, properly designed quasirandom patterns generated over the entire image can improve overall image quality by distributing noise into high frequencies (Mitchell, *Computer Graphics (SIGGRAPH '91 Proceedings)*, July 1991).

In summary, the camera simulation invention efficiently and accurately renders an image that would have been taken by a specified physical camera and lens system. Many realistic photographic effects are captured by this invention: for examples, depth of field, field of view, focusing behavior, image geometry, and exposure. The inventors have found that the implementation of the present invention is accompanied by only a slight increase of computational expense over prior art. They have rendered non-trivial images using fisheye and double-Gauss lenses in typically 90 minutes of CPU time on a Silicon Graphics Indigo2 workstation at 16 rays per pixel. Approximately 10% of that time was spent tracing rays through the lens system, and thus the use of the physical camera simulator is quite practical.

It will be clear to one skilled in the art that the above embodiments may be altered in many ways without departing from the scope of the invention. For example, it is obvious to those skilled in the art that the above techniques can be adapted to trace rays from object space to the image surface rather than the reverse. In this case, the roles of image space and object space reverse, as well as the roles of entrance pupil and exit pupil, and so on. Thus, the present invention includes within its scope both alternatives, and the terms used to describe one implicitly imply the reverse as well. The invention simulates a wide range of cameras and camera-like imagining processes. It can be used to simulate a zoom lens for example; changing the focal length in a zoom lens involves moving one or more elements relative to each other and the image surface (much like focusing). This can be accomplished by inputing the proper data about the elements' positioning as a function of zoom setting or focal length.

Several other important applications are apparent. The invention can be used to merge synthetic images, perhaps computer generated, with images acquired from a physical camera (whether a video, cinema, or still camera). In another example, the invention can be used in computerized vision systems which may want to test whether an internal representation of an image matches what is being observed elsewhere. Additionally, a real time virtual camera could be implemented in hardware for a specific camera system. In this example, one would make a thick lens approximation to the lens system, deriving the corresponding 4×4 transformation matrix, which allows for speedy real time rendering. Other uses for the present invention include: the simulation of the image formation properties of a proposed or prototype optical system before it is built; the simulation of a camera and lens system to photograph a particular scene with various camera settings for the purpose of learning, practicing, teaching, or studying photographic techniques; a device used to assist artists or others in choosing appropriate cameras, lenses, and settings for photographic or special effects work prior to making images with a physical camera and photographic equipment.

We claim:

1. A computer implemented method for rendering a three dimensional scene to generate a two dimensional image, the method comprising the steps of:

(a) computing an exit pupil of a lens system;

(b) selecting a ray that passes through the exit pupil to an image point on an image plane;

(c) tracing the ray from the three dimensional scene through the lens system to the image point;

(d) calculating a radiance value for the ray;
  wherein the calculation of the radiance value for the ray in step (d) comprises setting the radiance value to zero if the ray is vignetted;

(e) repeating steps (b)–(d) to obtain a plurality of radiance values; and (f) combining the plurality of radiance values to generate the two dimensional image on the image plane.

2. The method of claim 1 wherein the calculation of the radiance value for the ray in step (d) comprises calculating an attenuation due to losses in the lens system.

3. The method of claim 1 wherein the ray tracing in step (c) comprises the calculation of a 4×4 projective transformation corresponding to a thick lens approximation of the lens system.

4. The method of claim 1 wherein steps (c) and (d) are performed in dependence upon a wavelength of the ray, whereby rays of differing wavelength may be selected in step (b).

5. The method of claim 1 wherein the combining of the radiance values in step (f) comprises evaluating, for each image point, an approximation to an integral of radiances over the exit pupil.

6. The method of claim 1 wherein the selecting of the ray in step (b) is performed in accordance with a measure preserving mapping of a square to a disk.

7. A computer implemented method for rendering a synthetic two dimensional image of a three dimensional scene in a manner that accurately simulates a physical lens system, the method comprising the steps of:

(a) computing an exit pupil of the lens system;

(b) selecting a ray that passes through the exit pupil from a point on the image surface;

(c) tracing the ray through the lens system to determine an ultimate direction of the ray in object space;

(d) repeating steps (b)–(c) to obtain a first plurality of directions for a first plurality of rays;

(e) computing from the first plurality of rays and the first plurality of directions a selected second plurality of rays and a second plurality of directions;
  wherein step (e) includes the use of a thick lens approximation;

(f) calculating radiance values for the second plurality of rays; and (g) combining the plurality of radiance values to compute an image value at each pixel.

8. The method of claim 7, wherein step (f) comprises setting the radiance value to zero when a ray is vignetted by a shutter, aperture, stop, or other part of the camera system.

9. The method of claim 7, wherein attenuation in the lens system is accounted for in step (f).

10. The method of claim 7, wherein wavelength is accounted for in steps (c)–(g), whereby rays of different wavelengths may be selected in step (b).

11. The method of claim 7, wherein (g) comprises weighting the radiance values associated with rays in close proximity identically.

12. The method of claim 7, wherein (g) includes the use of the differential form factor from a point to a disk.

13. The method of claim 7, wherein (g) includes computing a separate weighting value for each radiance value.

14. The method of claim 7, wherein the two sets of rays and directions in step (e) are identical.

15. The method of claim 7, wherein step (e) includes the use of an approximating function.

16. The method of claim 7, wherein step (e) includes the use of a function that interpolates the plurality of ray directions.

17. The method of claim 7, wherein step (e) includes the use of a linear transformation.

18. The method of claim 7, wherein step (f) further comprises the interpolation of vignetting information.

19. The method of claim 7, wherein rays in are selected using pseudo-random sampling.

20. The method of claim 7, wherein rays are selected using stratified sampling.

21. The method of claim 7, wherein rays are selected by stratifying the pupil and image dimensions independently.

22. The method of claim 7, wherein rays are selected using quasirandom sampling.

23. The method of claim 7, wherein the mapping from a square domain to the domain of the pupil is measure-preserving.

24. The method of claim 7, wherein rays are selected using importance sampling.

25. A computer implemented method for rendering a three dimensional scene to generate a two dimensional image, the method comprising the steps of:

(a) computing an exit pupil of a lens system, wherein the exit pupil defines a boundary between rays blocked by the lens system and rays passing through the lens system;

(b) selecting a ray that passes through the exit pupil to an image point on an image plane;

(c) tracing the ray from the three dimensional scene through the lens system to the image point;

(d) calculating a radiance value for the ray;

(e) repeating steps (b)–(d) to obtain a plurality of radiance values; and (f) combining the plurality of radiance values to generate the two dimensional image on the image plane.

* * * * *